United States Patent
Hendriks

(10) Patent No.: US 8,397,633 B2
(45) Date of Patent: Mar. 19, 2013

(54) METHOD FOR PRINTING A SUBSTRATE USING AN ANILOX ROLL, AN ANILOX ROLL FOR A PRINTING METHOD AND A PRINTING APPARATUS

(75) Inventor: Martinus Adrianus Hendriks, Handel (NL)

(73) Assignee: Apex Europe B.V. (NL)

( * ) Notice: Subject to any disclaimer, the term of this patent is extended or adjusted under 35 U.S.C. 154(b) by 0 days.

(21) Appl. No.: 12/529,750

(22) PCT Filed: Dec. 22, 2008

(86) PCT No.: PCT/NL2008/050841
§ 371 (c)(1),
(2), (4) Date: Sep. 3, 2009

(87) PCT Pub. No.: WO2009/082225
PCT Pub. Date: Jul. 2, 2009

(65) Prior Publication Data
US 2011/0185928 A1 Aug. 4, 2011

(30) Foreign Application Priority Data
Dec. 21, 2007 (NL) .................................... 2001113
Dec. 21, 2007 (NL) .................................... 2001115

(51) Int. Cl.
*B41F 31/26* (2006.01)
*B41F 31/02* (2006.01)
*B41N 7/06* (2006.01)
*B41N 1/06* (2006.01)

(52) U.S. Cl. ..................................... 101/352.13; 492/30

(58) Field of Classification Search ............. 101/352.13, 101/352.11; 492/36, 35, 33, 31, 30; 118/212, 118/211
See application file for complete search history.

(56) References Cited

U.S. PATENT DOCUMENTS

| 4,301,583 | A | | 11/1981 | Poole | |
| 4,733,446 | A | * | 3/1988 | Kuroki et al. | 492/1 |
| 4,819,558 | A | | 4/1989 | Counard | |
| 4,939,994 | A | * | 7/1990 | Puleston | 101/348 |

(Continued)

FOREIGN PATENT DOCUMENTS

| DE | 102004015334 | 9/2005 |
| DE | 202006019713 | 3/2007 |

(Continued)

OTHER PUBLICATIONS

Joseph P. Trungale, "The Anilox Roll" Book, 1997.

(Continued)

*Primary Examiner* — Judy Nguyen
*Assistant Examiner* — Leo T Hinze

(57) ABSTRACT

The invention relates to an anilox roll for a printing apparatus. The anilox roll comprises a cylinder having a surface. The surface comprises a fluid distribution structure for receiving, distributing and transferring a fluid such as an ink. The fluid distribution structure comprises a channel formed in the surface having channel walls. This channel is arranged for distributing the fluid over the fluid distribution structure. The channel comprises channel parts, wherein the courses of connected channel parts are at an angle with respect to each other for preventing a linear distribution of the fluids to be received in a course direction of the channel, allowing a meandering distribution of the fluid to be received in the channel. Side walls of the channel are arranged for allowing a meandering flow of the fluid throughout the fluid distribution surface.

18 Claims, 4 Drawing Sheets

U.S. PATENT DOCUMENTS

Figure 1:
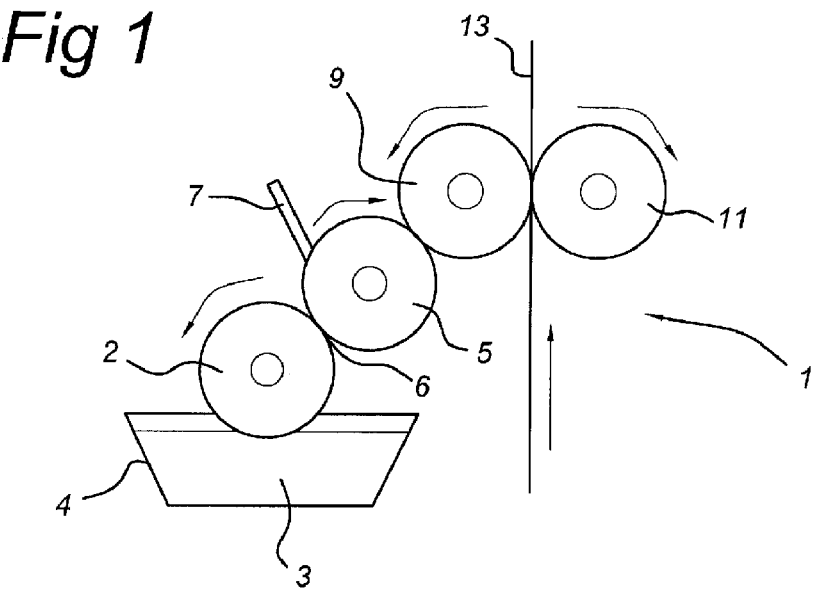

| | | | | |
|---|---|---|---|---|
| 5,047,116 | A | * | 9/1991 | Luthi et al. ............... 216/10 |
| 5,143,578 | A | * | 9/1992 | Luthi ............... 216/10 |
| 5,207,158 | A | * | 5/1993 | Fadner et al. ............... 101/348 |
| 5,221,562 | A | | 6/1993 | Morgan |
| 5,255,603 | A | | 10/1993 | Sonneville |
| 5,416,298 | A | * | 5/1995 | Robert ............... 219/121.68 |
| 5,426,588 | A | * | 6/1995 | Walters et al. ............... 700/117 |
| 5,503,876 | A | * | 4/1996 | Fields et al. ............... 427/286 |
| 5,522,786 | A | * | 6/1996 | Fields et al. ............... 492/33 |
| 5,608,969 | A | * | 3/1997 | Fields et al. ............... 29/895.3 |
| 6,240,844 | B1 | * | 6/2001 | Flosenzier et al. ............... 101/401.1 |
| 6,347,891 | B1 | | 2/2002 | Muckerhide |
| 7,063,014 | B2 | * | 6/2006 | Hashimoto et al. ............... 101/150 |
| 2004/0221755 | A1 | | 11/2004 | Hashimoto |
| 2006/0249491 | A1 | | 11/2006 | Juergensen |

FOREIGN PATENT DOCUMENTS

| | | |
|---|---|---|
| EP | 0400621 | 12/1990 |
| EP | 0472049 | 2/1992 |
| EP | 0499848 | 8/1992 |
| FR | 2449484 | 9/1980 |
| GB | 2214136 | 8/1989 |
| JP | 2006-110916 * | 4/2006 |
| WO | WO92/09399 | 6/1992 |
| WO | WO93/25387 | 12/1993 |
| WO | WO95/26270 | 10/1995 |
| WO | WO96/40443 | 12/1996 |

OTHER PUBLICATIONS

Interflex Laser Engravers, Interflex Advertisment in "Package Printing" Magazine, 2000.

Jack Kenny, "Anilox Rolls" Magazine, 2001.

International Search Report, Jan. 19, 2010, International Patent Application No. PCT/NL2008/050841, 7 pages.

European Search Report, Dec. 14, 2010, European Patent Application No. 10187252, 7 pages.

European Search Report, Dec. 23, 2010, European Patent Application No. 10187240, 6 pages.

International Search Report, Jul. 8, 2008, Netherlands Patent Application No. 2001113, 9 pages.

International Preliminary Report on Patentability, May 12, 2010, International Patent Application No. PCT/NL2008/050841, 12 pages.

International Search Report, Oct. 6, 2009, International Patent Application No. PCT/NL2008/050841, 7 pages.

International Search Report, Sep. 19, 2008, Netherlands Patent Application No. 2001115, 8 pages.

Written Opinion, Jun. 21, 2010, International Patent Application No. PCT/NL2008/050841, 7 pages.

Office Action, Jul. 6, 2011, Chinese Patent Application No. 200880125338.2, 6 pages.

Office Action, Feb. 22, 2012, Chinese Patent Application No. 200880125338.2, 4 pages.

Office Action (English Translation), Feb. 22, 2012, Chinese Patent Application No. 200880125338.2, 5 pages.

Office Action, Jun. 2, 2010, European Patent Application No. 08836787.5, 5 pages.

Official Notification, Oct. 19, 2010, European Patent Application No. 08836787.5, 3 pages.

Meyer, K., Technik des Flexodrucks, 5th Edition 2006, 2006, p. 71.

Trungale, J.P., "The Anilox Roll" book, 1997, pp. 69-74, 88-101.

PFFC—Paper, film and foil converter, Sep. 2001.

* cited by examiner

METHOD FOR PRINTING A SUBSTRATE USING AN ANILOX ROLL, AN ANILOX ROLL FOR A PRINTING METHOD AND A PRINTING APPARATUS

The invention relates to an anilox roll. The invention also relates to printing of substrates wherein use is made of an anilox roll. The invention further relates to a printing apparatus, comprising an anilox roll. The invention also concerns using and forming an anilox roll.

Anilox rolls have been used in flexographic methods in the printing industry. This printing method was used generally for printing different substrates, such as papers, labels, tape, (plastic) bags and boxes. Anilox rolls can be used in printing methods other than flexographic methods. Also offset printing and intaglio. An anilox roll is used in these other methods for transferring ink in precise and constant amounts.

An anilox roll comprises a generally hard cylinder, having a core of steel or aluminium. On top of the core a thin layer of ceramics is provided. In the thin layer usually small ink cells, hereafter cells, are engraved. In a known embodiment cells are formed having a hexagonal or honeycomb pattern on the surface of the anilox roll. The cells have a volume for receiving ink as a function of the size of the cell and depth of the cell. The size of the cells on the surface of the anilox roll will determine the density of cells. The density of cells is expressed in lines per linear centimeters. The volume of the cell will determine the operational mode of the anilox roll. Patterns and cells on the surface of the anilox roll can be formed using a laser by performing a laser engraving method. The method can comprise a continuous or pulsating laser. The laser is directed onto the surface of the anilox roll forming a laser spot and the laser spot will engrave a pattern onto the surface. The intensity of the laser is sufficient for locally vaporising the material of the outer layer of the anilox roll, for example chromium oxide. This will form a cell. A cell comprises a local recess in the surface of the roll surrounded by cell walls. A single cell wall can be a wall for two adjacent cells, separating the cells.

The anilox roll is mounted by bearings in a printing apparatus such as a flexographic apparatus. The anilox roll comprises longitudinal ends of the cylinder that can be mounted onto a frame of the printing apparatus. The anilox roll is releasably mounted in order to allow cleaning or radid changing. The anilox roll can rotate about its longitudinal axis in a circumferential direction.

The rotating anilox roll can be partially emerged in a ink fountain or a fountain roll is partially emerged in an ink fountain, said fountain roll being in contact with the anilox roll for transferring the ink onto the anilox roll and into the cells. In operation the printing apparatus comprising the anilox roll will operate to transfer ink onto the surface of the anilox roll and the surface structure is arranged for retaining the ink on and in the surface. The ink is viscous. A blade is used to scrape surplus of ink from the anilox roll or the ink roll. Ink will remain in the cells formed on the surface of the anilox roll.

In operation the anilox roll will rotate and the surface of the anilox roll will contact a rotatable printing cylinder. The printing cylinder will receive in an operational mode of the anilox roll a part of the ink collected on/in the surface of the anilox roll. The amount of transferred ink will depend on the image to be printed. The printing cylinder will transfer the ink in the next step onto the substrate. A problem in transferring the ink from the anilox roll onto the printing roll is that ink can remain in this formed cells on the surface of the anilox roll. The viscosity of the ink as well as the speed of the printing process can result in ink remaining on the anilox roll. This will effect the printing the substrate. Further ink residue will remain in the cells.

After a partial transfer of the ink from the surface of the anilox roll, that part of the surface will rotate further and will once again reach the ink roll or ink fountain. The cells can function as an air pump bringing air into the ink resulting in foaming of the ink, and said air in the cells will limit transfer of ink into the cell. The air in the cells should be replaced by ink and a certain amount of time is needed for making such a replacement, limiting the speed of rotation and finally the printing speed.

The desired colour intensity of the substrate to be printed will influence directly the volume of the cells. If the volume of the cells is increased, more ink will be printed on the substrate, intensifying the resulting colour. Heavy layers of ink are formed on the substrate using cells having a relatively large volume, transferring relatively large droplets of ink, while details in printing are obtained using cells having a relatively small volume.

The density of cells is expressed in lines per centimeter. Known line screens for prior art cell-like surface structures are for example 100-180 lines per centimeter. The different line screens have specific purposes. An anilox roll having 100 lines per centimeter is well suited for printing heavy layers of ink on a substrate. A relatively large volume of ink will be transferred in an operational mode of the anilox roll. Anilox rolls having 180 lines per centimeter will have a high resolution, making them more suitable for printing details on a substrate. Rolls having a higher line screen will transfer droplets of ink having a relatively smaller volume which will result in transferring less ink in total in this operational mode of the anilox roll. An anilox roll having a high line screen is less suitable for printing heavy layers of ink.

In prior art printing methods a balance is to be found between high resolution and colour intensity. A higher line screen can be provided with cells having more depth. This would increase the cell volume. However, in practice using cells of increased depth will result in an increase of ink residue remaining in the cell. Not all ink from the cell will be transferred onto the printing roll. Therefore still the printed substrate will not show the desired colour intensity.

One of the problems of prior art anilox rolls is the fact that an anilox roll can only have a single line screen. Known anilox rolls do not allow printing an image on a substrate wherein the image comprises both heavy layers of ink and details. Replacing an anilox roll is a time consuming and costly process, since printing will be disabled temporarily and different anilox rolls having different line screens are are to be provided.

Another problem in relation to known anilox rolls is the necessity of repeatedly cleaning the anilox rolls as a result of ink remaining in cells of the anilox rolls. This is due to the fact of the cell nature of the anilox roll. This will also result in waste of ink. Ink of subsequent printing processes will collect in the cells. The properties of the anilox roll will deteriorate. The anilox roll will have to be cleaned regularly. This is a time consuming and difficult process.

It is therefore a goal of the invention to alleviate or reduce at least one of the known problems of the anilox rolls. Another goal can be to provide improved methods for forming an anilox roll.

An improved anilox roll is provided by the invention. The anilox roll comprises a cylinder having a roll surface. In the surface a fluid distribution structure is arranged for receiving, distributing and transferring a fluid such as an ink. The fluid can be a liquid or pasty mass. The fluid distribution structure comprises a channel formed in the cylinder for distributing fluid over the fluid distribution structure. A channel improves fluid transfer properties in respect of cells. Fluid is received more easily in a channel, and a channel is cleaned more easily. A channel comprises a recess formed in the surface of the anilox roll that is surrounded by channel walls. The channel has a course. that is generally parallel to the direction of the channel walls at both sides of the channel part. The channel walls can locally converge of diverge.

In an embodiment the fluid distribution structure is arranged to transfer in a first operational mode for printing heavy layers of ink a suitable, relatively large fluid droplet and in a second operational mode for printing details a suitable relatively small fluid droplet. This is allowed according to the invention by a suitable combination of restrictions provided in the fluid distribution structure, wherein a restriction is formed by a local change of at least one of channel depth and/or channel width and/or channel form and/or channel wall. In one and the same distribution structure both functionalities, details and heavy layers, are arranged on the same surface depending on the operational mode.

An operational mode of the anilox roll is a functional behaviour during transfer of the fluid for printing substrate. When printing details, relatively small ink amounts are desired and for printing heavy layers of ink relatively large ink amounts are desired. An anilox roll according to this embodiment combines the two properties by providing restrictions formed on the surface of the anilox roll.

In an embodiment the relatively small droplets suitable for printing details are provided by open cells formed in the fluid distribution structure surrounded only partially by channel walls. The open cells are at least partially interconnected, allowing formation of a droplet size in the first operational mode that is suitable for printing heavy layers of ink by combining the volume of ink from different cells.

A restriction according to an embodiment comprises a change in the course of a channel or in particular a channel part. This allows forming a meandering channel. Ink can be distributed over the surface of the anilox roll in the channel. But the distribution is hindered by the meandering of the channel.

The anilox roll comprises in an embodiment for the first operational mode a fluid distribution structure comprising a meandering channel over the surface of the roll. The meandering channel forms a restriction. In the channel a relative large ink volume is received. The meandering channel forms a device for printing a heavy layer of ink. The device for printing a heavy layer of ink is part of the fluid distribution structure. The restrictions cooperate to form a structure of relative small volumes in the channel, however these volumes can be combined to form a relatively large droplet of ink in dependency of the operational mode. The operational mode is determined by the transfer of fluid from the anilox roll onto the printing roll. The printing roll comprises the image to be printed. The image can comprise details or a heavy layer of ink or another ink volume image and determines the amount of ink to be transferred.

In an embodiment the anilox roll comprises for the second operational mode channel parts formed in the, preferably meandering, channel, said channel parts having a droplet volume that is suitable for printing details. The channel parts form a device for printing details that is formed in the fluid distribution structure. Every channel part is arranged for transferring a fluid droplet of relatively small size to allow printing details. The channel part, on at least two opposite sides surrounded by channel walls, forms a restriction that allows a particular operational mode.

In an advantageous embodiment the device for printing a heavy layer of ink and the device for printing details overlap, allowing one and the same channel part to function according to the operational mode as determined by the ink transferring properties of the printing roll.

In an embodiment adjacent channel parts are positioned at an angle with respect to each other for preventing a linear distribution of fluid received in that channel in a course direction of that channel. As the channel parts are connected and the course of the channel parts are positioned at an angle, the formed channel will allows a meandering distribution of the received fluid in the channel.

In an embodiment the formed connection is relatively large with respect to the droplet size, and allow a droplet to move in between adjacent channel parts, although the angle and the meandering form of the channel prevent linear distribution of the ink.

In an embodiment of an anilox roll different channel parts can be indicated/recognized by a skilled person. Still a channel can be a relatively continuous, preferably also meandering, combination of channel parts that collectively form the fluid structure. Side walls of the channel do allow meandering distribution of the fluid received in the channel. The side walls of the channel are arranged for meandering a flow of ink throughout the fluid distribution structure, but also restrict lineair flow. The ink can be received into the channels, but can also be transferred for printing the substrate.

It is noted that U.S. Pat. No. 4,819,558 in the name van C. J. Counard discloses an anilox roll. The disclosed anilox roll comprises a cell structure of diamond shaped cells having a pyramid shaped depth. At the surface of the anilox roll two cells are connected by a straight channel of limited depth. In U.S. Pat. No. 4,819,558 the channel is not arranged for allowing two operational modes to be combined and to overlap in a single surface, and in particularly U.S. Pat. No. 4,819,558 does not disclose a channel having channel parts that combine to form a channel wherein the channel course is angled. The disclosed structure will allow only one operational mode in dependence of the size of the cells. Side walls of the channels are not arranged for allowing a meandering flow of fluid over de fluid distribution structure. The structure of the surface of the anilox roll according the U.S. Pat. No. 4,819,559 is a cell structure only.

It is noted that U.S. Pat. No. 4,301,583 discloses a anilox roll. The known anilox roll comprises a structure of honeycomb cells. Two adjacent cells are connected through a straight channel. The cells and channels form in a circumferential direction of the anilox roll a single row. The course direction of the channels in a row are located at a single line. The centre point of the connected cells are positioned in a single row. The linear distribution of the fluid is allowed in a circumferential direction of the anilox roll in the known embodiment. The side walls of the channel are not arranged to allow meandering of a fluid throughout a fluid distribution structure. The disclosed structure does not combine a device for printing heavy layers of ink and a device for printing details, but can function only according to one operational mode.

From WO 96/40443 a engraved roll is known, having a structure for distributing a fluid over the surface of the roll. The known structure comprises diamond shaped cells, the cells being positioned in a circumferential direction of the roll in a single line. The cells are interconnected through small channels. The course of the channels extends in the circumferential direction of the roll. Side walls of the structure as disclosed in WO 96/40443 are symmetrically positioned around the longitudinal axis of the channel, i.e. the course of the channel. The known channel allows linear distribution of the fluid in a circumferential direction of the roll. According to the invention restrictions will prevent such a linear distribution.

A restriction to be used in combination with the fluid distribution structure can be the channel depth. By reducing the channel depth a local change of the fluid distribution structure is obtained, which will allow reducing the droplet size of the ink to be received in the channel part having the reduced channel depth. Such a local change can form a weak link between cells formed at both ends of the channel having the reduced depth. The channel depth can for example be reduced with at most 50%, but preferably at most 30%. Because varying the channel depth will locally influence the size of the ink droplet to be received in the channel part, such a restriction is not preferred. In experiments by the applicant it is shown that a local change of restrictions cooperating to allow a constant local droplet size in the structure, results in the best printing properties.

The channel preferably has a generally flat or single level bottom. This will allow the channel to receive relatively large amounts of ink over its entire length or at least a large part of its entire length. A flat bottom improves the capabilities for printing in the first operational mode for printing heavy layers of ink.

A channel comprises channel parts that are connected to each other. The channel parts are arranged to receive ink droplets of relatively small size that are suitable for printing details. The connection between the channel parts comprises preferably a connection of the same channel depth as the channel parts. This will allow physical interaction between the volumes of fluid received in the adjacent channel parts.

In an embodiments the channel parts have a generally constant width. This will allow transport of fluid between the channel parts in a relatively simple way. The flow of fluid between the channel parts is diminished by changing the course of the channel.

In such an embodiment the channel lacks local congestion and/or upward pressure points. Upward pressure points have a negative impact on printing properties since the ink will be pushed out of the channel. This will prevent filling of the fluid distribution structure completely, which will diminish the function of the device for printing heavy layers of ink. In particular upward pressure can be the result of a blade scraping the roll. U.S. Pat. No. 4,819,558 discloses such upward pressure point formed by converging walls, converging in a direction parallel to the circumferential/rotational direction.

In an embodiment the restrictions are formed by side walls of the channel. The restrictions comprise preferably at least 90%, in an embodiment at least 95%, and in an embodiment at least 98% restrictions in the form of wall parts. A wall part will extend above the fluid level when fluid is received in de structure, between the wall parts.

It is possible that wall parts forming side walls of a channel extending perpendicular from a bottom of the channel. By application of perpendicular side walls restricting the bottom of the channel, a channel can receive a relatively large amount of ink. The channel preferably has a U-shaped cross-section. The channels can have a limited depth in respect of pyramid shaped cells, which will reduce the chance of ink residues remaining in the channel after transferring ink onto the printing roll. A generally flat bottom will prevent forming stagnation or upward pressure points/regions in the channel.

The anilox roll having a surface according to the invention will allow combining the properties of an anilox roll having a cell structure of 100 lines per centimeter (first operational mode) and an anilox roll having a cell structure of 180 line per centimeters (second operational mode) to be combined. The invention allows a resolution up to 300-500 lines per centimeter, and such an anilox roll according to the invention will still be able to print heavy layers of ink having desired colour intensity properties. An anilox roll will have a surface that will allow the ink to be received more evenly distributed. Stress is reduced in the ink. The ink lies calmly on the surface of the anilox roll, which will allow subsequent transfer.

Ink is received in the channel parts more easily in comparison to a cell structure. Ink can be transferred from the surface of the anilox roll more easily. Tensions in the ink will be reduced during transfer. Rotation of the anilox roll during the printing process will result in less scraping of the ink from the anilox roll in comparison to a cell structure. The ink is pressed in front of the blade and is received in the open structure of the channels. The internal stress in the ink is reduced. An advantage is that printing a heavy layer ink is possible, whilst having a grid of fine lines that allows printing details on a substrate.

Distribution of the fluid is allowed according to one aspect of the invention in a limited way. By limiting distribution of the fluid over the fluid distribution structure a problem known for prior art anilox rolls is prevented. Known anilox rolls having parallel straight channels will allow too much distribution of the fluid, which results in not being able to dose the ink in proper amount, in particular for printing details. The restrictions according to the invention will allow such dosing in relatively small amounts of ink.

In an embodiment wall parts of a channel part are positioned in a radial direction from a position in the fluid distribution structure within a distance less than 120 µm, in an embodiment less than 100 µm, preferably less than 80 µm. Every location within the fluid distribution structure is surrounded by a restriction at a relative short distance.

This will prevent linear distribution of the fluid in an efficient manner. It is advantageous to restrict distribution of fluid in radial direction using wall parts. A limited distribution is allowed only. The channel comprising channel parts does not extend linearly, but is suitably curved.

The curvature in an embodiment is a least such that straight connection lines between locations in different channel parts are prevented. A suitable curvature can be an angle of at least 30 degrees, in an embodiment at least 45 degrees and in an embodiment at least 90 degrees.

In an embodiment foaming is prevented by channel parts extending, and preferably a channel having channel parts extending generally in a circumferential direction of the anilox roll. Such channels can be formed in a suitable manner as will be explained in more detail hereunder or using known techniques for forming such channels, wherein such channels extend adjacent to each other in a circumferential direction of the anilox roll.

Preferably in a longitudinal direction adjacent a first channel, a second channel is formed. The second channel is parallel to the first channel. A fluid distribution structure can comprise parallel oscillating or wavy channels. Such oscillating channels can be formed parallel to each other. The channels can be separated from each other by means of a separation wall or side wall. In a channel a meandering flow of fluid is allowed, preferably in a circumferential direction of the anilox roll. The ink can be distributed over the anilox roll. The free path in the channel structure is limited by restrictions according to the invention which will allow printing of details onto a substrate due to relatively small volumes of ink formed in the fluid distribution structure.

A wall between the first channel and the second channel can have a width of smaller than 4 µm, preferably in a range of 1-3 μm. Arrangements of relatively small walls will results in a relatively large amount of surface of the anilox roll that can be used for receiving fluid. The amount of received and transferred ink in combination with the high resolution of detail is improved substantially with respect to prior art arrangements and allows functioning in both operational modes. In combination with the perpendicular side walls extending from a bottom of the channel, the channel will have a relatively large volume for receiving ink, said volume of ink being easily transferable, leaving small amount of ink residue, for printing details. The channels comprise restrictions that allow printing details in the image printed on the substrate. Restrictions are formed by wall parts of the channel. The amount of ink that can be transferred is, when ink is combined from different channel parts, enough to allow printing of heavy layers of ink on the substrate.

To allow a meandering flow of fluid in the channel, the side walls of the channel can be formed anti-symmetrical with respect to the course of the channel. This will allow forming a wavy or oscillating pattern of channels. The channels have a course that follows a sinus. The course of the channel changes at every position and this change forms a restriction according to the invention, which allows the anilox roll to function according to both operational modes. The wall parts of the channel, in this embodiment oscillating wall parts, allow a connection between the ink volumes received in the channel over the length of the channel, but do also allow disconnecting the connection between the ink volumes as a result of curvatures in the channel course, allowing obtaining relatively small volumes of ink for printing details.

The oscillating channels can have an amplitude that is generally equal to or preferably larger than the width of the channel. This will prevent the linear distribution of fluid in the oscillating channel. A flow of fluid in the channel is will force ink to follow the meandering channel, already curving at a distance from the channel side walls.

In an embodiment channels have a width in the range of 10-200 μm, in an embodiment 10-100 μm, preferably 15-80 μm.

In an embodiment a channel part is cell shaped. Cell shaped is to be interpreted as not comprising a closed cell. It is possible that the fluid distribution structure comprises a number of separated wall parts that surround cell shaped channel parts. The separated wall parts are fluid conducting walls that allow directing a flowing fluid in a desired direction. Meandering distribution of the fluid in the channel formed between cell shaped channel parts is allowed. A linear distribution of the fluid is prevented. The fluid can be distributed over a large area of the fluid distribution structure, but the distribution is diverted by restrictions that allow meandering distribution only.

The cell shaped channel parts have at least three open connections with adjacent cell shaped channel parts. This allows distribution of the fluid received in the channel parts and allows a meandering distribution. The cell shaped channel parts are unlike cells according to the prior art, part of a channel that receives ink droplet suitable for printing details. The connection between channel parts is arranged to allow a relatively substantial amount of the droplet volume to move freely between adjacent channel parts, but does not allow linear distribution. The structure of the surface of the anilox roll according to the invention formed by restrictions is not a cell structure that allows receiving fluid in the respective cells and the structure according to the invention does not allow unlimited linear distribution of the fluid over the surface.

The cell channel shaped channel part is in an embodiment characterised by channel wall parts that converge towards a connecting part that forms the connection between the first cell shaped channel part and another cell shaped channel part. In an embodiment a channel part according to the invention is provided only if the connection part is at least 10% of the channel width. 10% width guarantees sufficient distribution.

In an embodiment a cell shaped channel part has at least two connections within adjacent cell shaped channel parts. This will allow the combination of the fluid volume received in the channel parts in a first operational mode, because the connections allow combining the two ink volumes, and in the second operation mode, as the connection between the connected cells can be separated in a second operational mode, allowing transfer of small volumes of ink. If multiple connection parts between two adjacent cell shaped parts are present, the connection parts can be smaller. In an embodiment such connection parts can be smaller than 5% of the channel width. The smaller connection parts preferably do not have a reduced channel depth.

Further a width of an open connection between channel parts is preferably at least 40%, and more preferably at least 60% of a width of a cell shaped channel part.

In an embodiment a cell shaped channel part has at least three adjacent cell shaped channel parts. This will allow obtaining ink volumes for printing heavy layers of ink in a straight forward manner. In a preferred embodiment the cell shaped channel part has at least two connections which each adjacent cell shaped channel part. This will allow easy transfer of the ink and combination of the ink volumes during transfer in the first operational mode.

In an embodiment the bottom of the connection between channel parts is at the same level as bottoms of the channel parts. A restriction in the flow between the channels is reduced and is only limited by the position of the channel walls. The channel depth is not a congestion point for the ink, which would result in not optimally applying the properties of the fluid distribution structure.

The open channel structure allows a high line screen of preferably over 120 lines per centimeter and in an embodiment at least 150 lines per centimeter. This allows printing in a high resolution. The open structure allows the transfer of high volumes of ink that in prior art arrangement would only be possible if cell structures would be used having relatively low line screen. The invention allows a high line screen and printing of heavy layers of ink having a desired intensity.

The channel formed in the surface of the anilox roll extends over a relative large surface area through connections. This relative large surface area allows collection of a large amount of ink during transfer. The connected channel parts can have a surface area of at least four or six or even ten times larger than the surface of the cell of anilox rolls according to the prior art.

According to an embodiment the fluid distribution structure has a grid. The grid repeats itself over the surface of the roll. The grid is formed by wall parts of the channel and channel parts formed between the wall parts. The grid forms the fluid distribution structure that allows a limited distribution of the fluid of preferably at most four times the size of the grid. In an embodiment a linear connection between two points on the fluid distribution structure is limited to a length of at most four times the grid size. The skilled person will be able to determine a grid size. A grid size can be determined in a manner similar to prior art arrangement, for example lines per centimeter.

In an embodiment the free path, that is the length in a straight line from a point in the fluid distribution structure that is positioned between two walls in a first direction is at most four times the free path in the second direction perpendicular to the first direction. The second direction is preferably a connecting line between two generally parallel walls or the course direction of the channel part. The distribution as a result of a free floating path is in this embodiment ellipse shaped. The limited distribution correlates preferably with the grid size and therefore with the length of the connection line between two at least parallel side walls of two different open cells. The limited distribution according to an embodiment is further limited to at most three times the grid size.

Preferably an anilox roll is provided having a channel part that is cell shaped having a combined surface area of at least 20.000 and more particular at least 40.000 $\mu m^2$. In an embodiment the combined surface area spreads around the complete cylinder. The combined surface area is the accumulation of every connected open cell in that channel. Such surface area can be substantially larger than the surface of the cell structure of comparable anilox rolls according to the prior art. Such surface areas are similar to at least four connected cells of known grid pattern (100 lines per centimeter) for anilox rolls having cells.

In an embodiment channel parts extend generally in a circumferential direction of the anilox roll. This will allow an open connection between channel parts in a circumferential direction. This is advantageous for filling the channel parts with the fluid. Because the channels are connected with other channel parts in a circumferential direction, ink is received more easily in the channel in respect of anilox rolls having cells according to prior art arrangements, while the channel part, preferably having a reduction in width of at most 40% at a connection between channel parts, allows escaping of air trapped in the channel that is receiving the fluid. This reduces the amount of foaming of the ink during the printing process.

In an advantageous embodiment a structure of restrictions formed by walls is provided having a pattern of wall parts and wall parts positioned perpendicular to the first wall part, wherein said wall parts are at least twice the size of the channel width of the channel formed between the wall parts. This is a particularly simple embodiment of an open structure having a limited free path. In an advantages embodiment the free path is at most four times the channel width.

The invention further relates to a printing apparatus. The printing apparatus comprises a printing device having a supply for a substrate to be printing and a supply for ink, wherein the printing device comprises an anilox roll mounted in a bearing, said anilox roll comprising at least one of the features mentioned above.

The invention also relates to a method for forming an anilox roll. The method comprises supplying a cylinder for an anilox roll that has an outer surface to be tooled. The method preferably comprises providing at least a laser source and laser engraving the outer surface of the anilox roll. It will be clear that a person skilled in the art will be able to use future techniques that work in a similar way as a laser, for carrying out the method according to the invention.

The method according to the invention comprises laser engraving the outer surface of the anilox roll with a laserspot that is formed with the laser source. The laser and its laser spot are able to focus the intensity of the beam to a small position on the anilox roll. This allows tooling the anilox roll. The anilox roll may be used in the printing industry.

The method according to an embodiment of the invention comprises applying an optical guide in the light path of the laser for enabling the laserspot to execute a reciprocal movement on the outer surface to be tooled. The reciprocal movement leads to a repetitive movement in the position of the laser spot. The reciprocal movement preferably causes a shift of the laser spot on the anilox roll in a direction that is mainly parallel to a longitudinal axis of the anilox roll. This creates the ability to execute repetitive movement of the laser spot on the surface to be tooled, in a surprisingly simple fashion.

In an embodiment, the laser spot will mainly move with a constant speed over the surface of the roll. A generally even evaporation of surface material of on the surface of the anilox roll is obtained. This allows forming a generally uniform channel. The depth of the channel will be at generally a similar level throughout the formed channel. Further the channel will have a generally U-shaped cross-section.

In an embodiment the optical guide is a crystal. The reciprocal movement is caused by supplying an varying current to the crystal. With this, a deflection in the trajectory of the laser beam may be caused, resulting in movement of the laser spot. The varying current may be a sine like current, such as a well known alternating current (AC). With this, a sine like reciprocal movement is generated.

Preferably, the method comprises a shift in the reciprocal movement of the laser spot that is at least larger than the width of the laserspot in the likewise direction. This way, it is possible to laser engrave an outer surface having a width of two or more times the width of the laser spot. The surface may be engraved in a single operation of the method for forming an anilox roll. The result is that laser engraving is be performed more quickly.

It is furthermore advantageous to laser engrave the anilox roll, whilst rotating the anilox roll around a longitudinal axis of the anilox roll. In addition, the laser may be moved in a direction mainly parallel to the longitudinal axis of the anilox roll. By this, the complete surface of the anilox roll may be tooled. This technique is known from the state of the art. By applying the reciprocally moving guide, prior art methods may be accelerated.

It is exceptionally advantageous to apply the method using a continuous laser. This enables the possibility to move the continuously while reciprocally moving the laser spot over the surface. In combination with the rotating anilox roll, which may rotate around its longitudinal axis, a wobbling track may be burned. This track is comparable to a track on a CD or DVD. The method of forming an outer surface that comprises such a wobbling groove, surrounded by walls that are left unburned, may advantageously be applied in the printing industry. Laser engraving is used here to form a channel that extends in a rotational direction of the anilox roll.

A further goal of the invention is obtained by an apparatus for forming an anilox roll for use in a printing process, comprising a supporting unit for supporting the cylinder shaped anilox roll and for rotating the anilox roll around a longitudinal axis. According to an aspect of the invention, the apparatus comprises an engraving unit that is arranged for parallel movement with respect to a cylinder-axis of the anilox roll for engraving a structure on the outer surface of the anilox roll, especially in combination with a rotating anilox roll. The apparatus also comprises a driving unit for driving engraving settings of the engraving unit. The engraving settings are the driving parameters for the engraving, with which the engraving can be influenced. The person skilled in the art will understand how to set the engraving.

Advantageously, the engraving unit comprises at least a laser for laser engraving the outer surface of the anilox roll with a laser spot. At least one goal is obtained when the engraving unit further comprises an optical guide for adjusting the light path of the laser, and more specifically for moving the laser spot in a repetitive or reciprocal way. With this, an additional shift of the laser spot is possible. The position to be tooled may also be chosen this way. By using an optical guide, it is possible to realize an additional shift of the spot, allowing quick and small shifts. More specifically, these shifts may be repetitive.

In a further advantageous embodiment, the optical guide is a deflector. A deflector, such as a crystal may be used, with which the trajectory of the laser, and thus the position of the laser spot may be adjusted, more specifically shifted. The deflector may be controlled in a fast and accurate manner. The person skilled in the art will be familiar with the different deflectors for creating a repetitive transition of the laser spot. In an advantageous embodiment, the crystal may be connectable to a power supply, more specifically a drivable or controllable supply, wherein the voltage supplied is in proportion with a certain deflection and more specifically a shift of the laser spot.

In an embodiment, the crystal may be arranged for deflecting the entering laser beam in a voltage depending way.

In another advantageous embodiment, the engraving unit comprises an optical guide that is positioned in the light trajectory of the laser, wherein the guide is movably connected to the engraving unit. This enables the movement of the laser spot on the surface of the anilox roll, additional to the movement of the engraving unit as a whole. The extra movement is superimposed.

It is especially advantageous to connect the optical guide to the engraving unit by means of a movement unit, wherein the movement unit is arranged for enabling the laserspot to execute a reciprocal movement. This way, a reciprocal and repetitive movement of the laser spot may be used for forming a regular structure on the anilox roll. This regular structure may be obtained by engraving a rotating anilox roll, and additionally move the laser in a longitudinal direction along the roll. The structure thus formed, is different from the lined structure formed in a usual manner.

The reciprocal movement preferably causes a movement of the laser spot in a direction mainly parallel to the cylinder axis. With this, a larger surface may be tooled in a single labour—step. Preferably, the shift is at least larger than a width of the laser spot in the likewise direction. This allows tooling an area having a width of at least twice the spot size. Also, with this a wave like motion may be obtained when the reciprocal movement is combined with a rotation of the aniloxrol around its longitudinal axis.

According to the invention, the laser may be a continuous laser. Especially in combination with a rotating anilox roll and a reciprocally moving guide, a track or channel is formed on the anilox roll. The track has a wobble. The driving unit is preferably connected to the supporting unit and to the movement unit. The driving unit may be arranged for rotating the anilox roll during the laser engraving with a reciprocal moving laser spot. This enables the manufacturing of a novel anilox roll, having advantageous properties for transferring ink. The ink may be easily absorbed temporarily in the wobbling channels.

It is advantageous to provide the engraving with an objective lens. The lens is able to focus the laser. The lens may be the optical guide that performs a reciprocal movement.

It is possible to provide the engraving unit with two lasers or more lasers and/or with one or more beam-splitters. This way multiple channels may be provided in the anilox roll simultaneously.

In an preferred embodiment, the reciprocal movement leads to a shift of the laser spot of at least 20 µm. This small shift may be sufficient for creating a wobble in the channel on the tooled surface of the anilox roll.

Although the invention is described and will be described with respect to preferred embodiments, it will be clear that within the scope of the invention, multiple and different embodiments are possible. It is a goal of this application to protect the embodiments described, the embodiments indicated by the claims, as well as equivalents thereof. The person skilled in the art will—now that the advantages of the invention are experimentally known—be able to construct different embodiments. It is an intention of the inventor to also protect these embodiments with this application.

More specifically, the skilled person is able to form restrictions on the surface of an anilox roll in accordance with the disclosure in this application that allows obtaining one or more of the advantages. Functional protection should therefore be allowed.

In the above, as well as in the following description, aspects of the invention are described and advantages of the measures are described. The inventor intends to protect all the mentioned and unmentioned advantages that the invention has with respect to the state of the art, using this application and/or divisional applications.

Figure 2A:
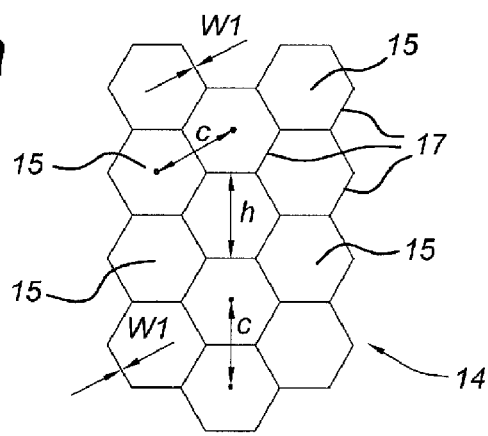

The invention will be described by reference to the following description taken in conjunction with the accompanying drawings in which:

FIG. 1 is a schematic side view of a printing apparatus for a flexographic process;

FIGS. 2a and b are detailed views of a surface of an engraved anilox roll according to the state of the art.

FIG. 3a-h are detailed views of embodiments of an outer surface of an anilox roll according to the present invention.

Figure 3A:
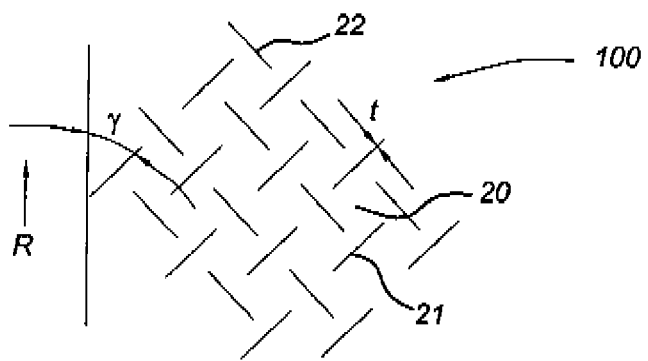
Figure 3B:
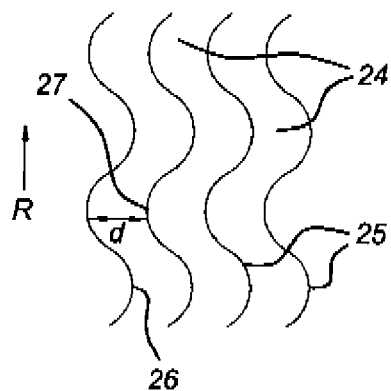
Figure 4:
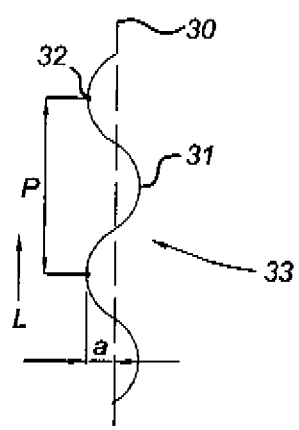
Figure 5:
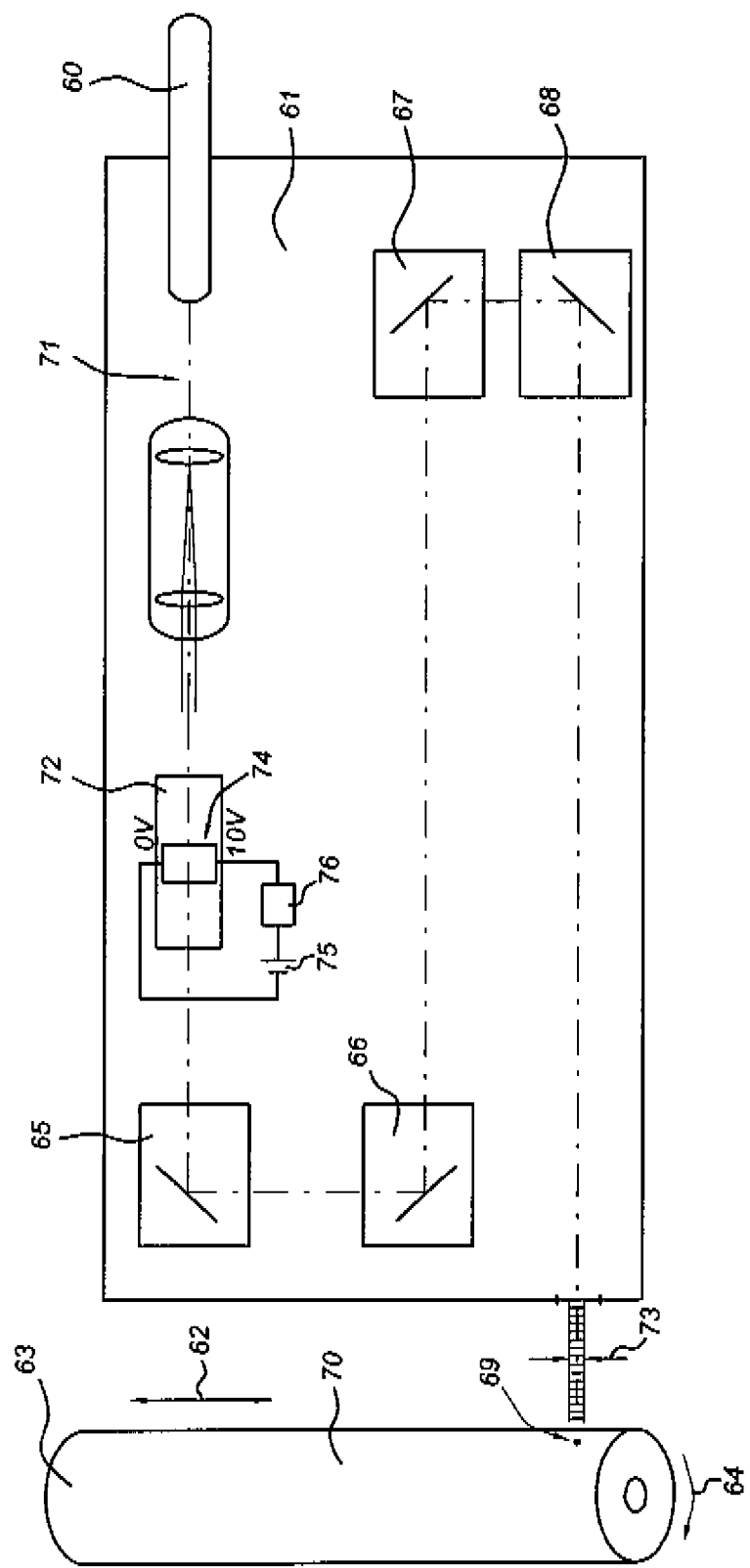

FIG. 4 is a detail of a part of the canal section of an anilox roll according to the embodiment of FIG. 3b, and FIG. 5 is a schematic view of an embodiment of a engraving device according to the invention.

FIG. 1 shows a schematic side view of a part of a printing apparatus 1 used for example in a flexo process. The printing apparatus 1 may be part of a series of printing apparatuses for printing with different inks or printing with various techniques. The person skilled in the art will be familiar with the different embodiments of a printing apparatus 1. The printing apparatus 1 is suitable and arranged for applying ink to a substrate in a desired pattern.

In the embodiment shown the printing apparatus 1 comprises a fountain roll 2 which is partly emerged in an ink fountain 4 comprising a certain amount of ink 3. The fountain roll is rotatable, and the outer surface of the fountain roll may be a rubber coating.

Next to the fountain roll 2 a rotatable metering roll or anilox roll 5 is positioned, wherein the longitudinal axis of the anilox roll 5 is positioned parallel to the longitudinal axis of the fountain roll. This allows forming a contact point or contact line 6. The rolls 2 and 5 are in contact, or almost in contact with each other. Adjacent a circumferential side of the metering roll, a blade 7 is positioned over at least a part of the length of the metering roll. In line with the longitudinal axis of the metering roll 5, a rotatable printing cylinder 9 is positioned. The printing cylinder comprises elevations and recesses, the elevations forming a negative of the image to be printed.

The elevations and recesses determine the operational mode for the anilox roll 5. When the image contains details, ink in the form of relatively small drop sizes should be transferred from the anilox roll onto the substrate, whilst for printing heavy layers of ink relatively large drop sizes are to be transferred.

The substrate 13 or the product to be printed may be positioned next to a circumferential side of the printing cylinder. The substrate is movable in a lengthwise direction. A rotatable impressing roll 11 is positioned next to a side of the printing roll 9, wherein the printing roll 9 and the impressing roll 11 are positioned on both sides of the substrate.

In the figure an example of a substrate 13 is shown. It will be obvious that different sorts of substrates 13 may be printed. The person skilled in the art will be able to adapt the printing apparatus to the substrate to be printed.

An operational method of the apparatus shown will be described next. When the apparatus is operated, the fountain roll 2 will be driven, resulting in a rotation of the fountain roll 2 such that the outer surface of the roll will move through the ink 3 of the ink fountain 4. The outer surface of the fountain roll can comprise a rubber layer, the ink will be absorbed and will be transported in the direction of the anilox roll 5, which is rotating in an opposite direction compared to the fountain roll. Near the contact point 6, the ink will be transferred from the fountain roll 2 to the anilox roll 5. The surface of the anilox is provided with a structure for absorbing ink. The structure is described in more detail in FIG. 2.

The anilox roll 5 will absorb a certain amount of ink of the fountain roll 2. The blade 7 ensures that an excess of ink is scraped off, such that the anilox roll 5 absorbs and retains with a suitable amount of ink. Next, the ink will be transferred onto the printing roll 9. A fine layer of ink is transferred onto the elevations of the printing roll 9. Compared to the anilox roll 5, the printing roll 9 is rotating in opposite direction. The printing roll 5 will continue to rotate and will apply the image to the substrate 13. The impression roll 11 supports the substrate during the printing process.

Other configurations are also possible. The apparatus may be provided with a closed ink fountain 4 comprising an ink supply and an ink drain. It is also possible that multiple blades 7 are provided. The description of the configuration is only meant to be an example. It may be obvious that multiple configurations of the anilox roll 5 are possible, without diverting from the invention.

FIG. 2a shows a detailed view of a surface of an anilox roll 5. The surface structure shown is known from prior art. The anilox roll 5 is provided with a structure 14, which may be formed of a plurality of regularly positioned cells 15. The cells 15 are formed by recesses in the anilox roll 5. The cells 15 are separated from each other by means of side walls 17 having a width w1. According to the state of the art the width w1 may be 10-80 μm. The side walls ensure that the ink cannot move from one cell to another. If ink is provided onto the surface of the anilox roll having the surface structure 14, side walls 17 will extend above the ink level. Ink will be inserted in cells 15. Excess ink will be removed by blade 7.

The cells have a global size h in the order of 10-80 μm. Each cell has a depth (not shown). Each cell has a certain volume. The ink volume corresponds with the ink droplet to be transferred onto the printing roll and the substrate.

In the embodiment shown the cells are hexagonally shaped, and the cells are positioned in a honeycomb like structure. The distance c between the centre point of two neighbouring cells, wherein the distance is measured perpendicular to the rotating direction of the roll, determines the line screen of the anilox roll. Known line screens for prior art cell-like surface structures are 100, 120, 140, 180 lines per cm.

Figure 2B:
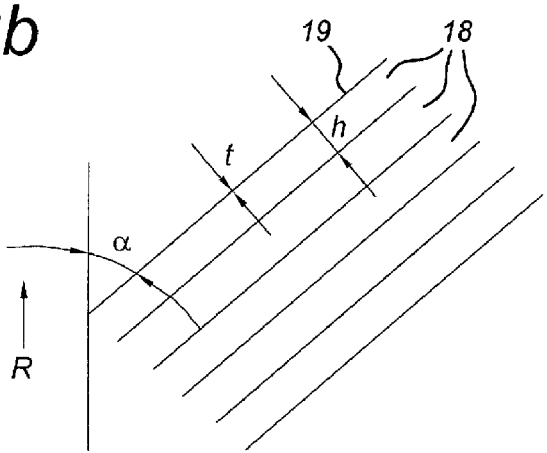

FIG. 2b shows another embodiment of an outer surface of an anilox roll according to the state of the art. In this embodiment channels 18 are applied along an outer surface of the metering roll. The channels have a width h (15-80 μm) and are separated from each other by means of a wall 19 having a thickness t. The longitudinal direction of the channels is positioned with an angle α with respect to the direction of rotation R of the metering roll. Such an embodiment is suitable for applying ink to the substrate in a smooth fashion. It is clear that the channels are straight lines and thus that there is no restriction in the spreading of ink in the channel.

Anilox rolls presently known do not individually meet the criteria that are currently set in the printing industry. Therefore it is necessary in many applications that different anilox rolls are used, which is something that slows down the printing process and which makes the printing process labour intensive time consuming and expensive.

FIG. 3a shows a first embodiment of an anilox roll according to the present invention. FIG. 3a shows a view of the rolling surface 100 of an anilox roll wherein a fluid distribution structure is applied. The fluid distribution structure is shown more specifically by means of wall parts of channels that are formed in the structure. The wall parts are repeatedly indicated with lines. The "void" parts in FIG. 3a are recesses in the rolling surface, which may for example be formed by means of laser and graving and/or laser evaporation.

The part of the rolling surface 100 that is shown in FIG. 3a is provided with a pattern, which is formed by two wall parts 21, 22 that are positioned with an angle with respect to each other. The wall parts form darns or restrictions and have a thickness t. The wall parts 21, 22 are surrounded by a channel 20 which spreads over the outer surface of the anilox roll. The channel is arranged for absorbing mass, more specifically ink. The ink may be taken up in the formed channel 20 and may spread over the outer surface, wherein the restrictions ensure that the ability to flow is limited.

In an embodiment the first restrictions 22 are placed with an angle of about 90 degrees with respect to the second restrictions 21. The first restrictions 21 are furthermore positioned with an angle γ with respect to the direction of rotation R of the anilox roll. Preferably γ is equal to 0 degrees. The second restrictions are positioned longitudinally from the first restriction, and the restrictions are positioned with an angle of 90 degrees with respect to each other. Other angles are of course imaginable. In this fashion a regular pattern is obtained. In an embodiment the pattern may form a herringbone pattern.

Preferably the pattern of the anilox roll is formed in such a manner that an ink volume only has a limited free path or pathway distance, measured from an arbitrary point in the absorption surface 20. The pathway distance is defined as a distance that an ink part may move in a random radial direction starting from a random point in a channel until a wall is reached. Preferably the free path is smaller than 150 μm, and in the embodiment shown smaller than 100 μm. Preferably the free path is less than 50 μm. The free path ensures that the ink can freely flow along a certain, but restricted length. Due to the fact that the free path is limited, a resistance force is applied to the ink such that the ink cannot flow freely over a too large part of the roll. Due to the fact that the restrictions are positioned at a relatively short distance from each other, a large distribution of ink is impossible. Surprisingly, in this fashion an anilox roll is obtained that on the one hand has an open structure, but wherein on the other hand cells, in this case open cells can be recognized. Printing tests with such an anilox roll have shown that such a structure allow printing of heavy layers with sufficient color intensity as well as printing of small detailed structures. According to the state of the art, this result was only obtainable by printing in two steps, more specifically by first using an anilox roll with a small line screen, and then using an anilox roll with a large line screen, or vice versa.

In an embodiment the restrictions have a width t which is smaller than 8 μm.

Preferably the restrictions have a width that is smaller than 5 μm. Even more preferably the restrictions have a width t that is between 2 and 3 μm. In this fashion the walls only form a very small part of the total surface of the circumference of the anilox roll. It will be clear for the person skilled in the art that the wall parts according to the present invention function primarily as restrictions against free distribution of ink, when the ink is present between the walls.

The location of the restrictions allows forming open connections in the structure on the outer surface of the anilox rolls. The ink may distribute well over the anilox roll, especially when the ink is taken up in the channel. The restrictions are placed in a way to ensure that the ink cannot freely flow, especially when the ink is being released. The wall parts form restrictions on the anilox roll and ensure that the ink is kept in place on the anilox roll. The presence of the large absorption surface 20 ensures that the anilox roll according to the present invention is able to take up a large volume of ink. In addition, the restrictions enable that the ink may be taken up well from the fountain roll. The positioning of the restrictions is such that ink received in the fluid distribution structure can freely, but limited, distribute over the anilox roll, such that generally a small film layer of ink is provided on the anilox roll.

Additionally, unlimited distribution of ink is prevented by the restrictions, since the restrictions form natural barriers against ink flow. Additionally, the structure of the anilox roll ensures that transfer of ink onto the printing roll is possible in multiple operational modes. Negative parts of the printing roll are provided with a dosed amount of ink, wherein also the detailed parts of the negative are provided with the suitable amount of ink.

It is therefore possible with an anilox roll according to the present invention to obtain a good color intensity and heavy layers, as well as fine structures in line art. Therefore it is not necessary anymore in specific cases wherein both full colour intensity as well as details are important, to switch the anilox roll. Only one anilox is needed for printing both heavy layers and fine details.

Another advantage of the anilox roll according tot the present invention, is that it needs to be cleaned less often. Anilox rolls according to the state of the art have large amounts of walls 17, 19. In addition, the walls 17, 19 take up a large amount of space with respect to the total available inking surface. According to the present invention the wall parts take up less than 10%, in an embodiment less than 5% or 3%, preferably less than 2%, of the total surface of the anilox roll.

To transfer a suitable amount of ink, the cells 15 and channels 18 according to the state of the art have a relatively large depth. Often, the depth of the cell or the channel is larger than the width thereof. This results in the fact that it is hard for the ink to get out of the cell or the channel, and eventually ink residues will accumulate and block the cell or channel. The anilox rolls then need to be cleaned. This is a hard and tedious job, which is also due to the fact that the cells and channels have a relatively large depth. In addition the anilox rolls may be damaged easily during cleaning.

In the anilox rolls according to the present invention this problem is less relevant. Due to the fact that a larger absorption surface 20 for ink is present, a smaller depth will be needed to transfer the right amount of ink. In addition the restrictions are positioned at a relatively large distance with respect to each other. This ensures that transfer of the ink is relatively easy, such that accumulation of ink in the anilox roll according to the present invention is less likely to happen. An additional advantage of the relatively large distance between the restrictions, and the relatively smaller depth of the anilox roll, is that the surface structure can be reached more easily for cleaning thereof.

In an embodiment of the present invention, as shown in FIG. 3b, meandering channels 24 are provided, having uniform walls 25. It is relatively easy to form this embodiment. The meandering channels may have the form of a wave, more specifically a sine wave, see FIG. 4, wherein in succession a turn in the one direction is alternated by a turn in the other direction. With reference to FIG. 4, the walls have a top 32 and a bottom 31, wherein the walls have an amplitude a and wherein the walls oscillate around a base line 30.

Preferably the base line 30 of the sinusoid, is positioned parallel to the direction of rotation R of the anilox roll. The course of the meandering channel 24 follows a sinusoid.

Due to the fact that in a preferred embodiment the amplitude of the wave is larger than the width of the channel, a channel is obtained with limited possibilities for spreading or distributing of the fluid received in the structure. In this application, the term free path is used. Free path refers to a radial expansion from any arbitrary point in the formed channel. In the sinusoid channel shown, the free path is limited to a maximum of one wave length. By limiting the free or radial distribution, it is possible for the ink to be absorbed in the channels on the outer side of the anilox roll. The limited distribution results in a decreased tension in the ink that is absorbed on and supplied from the anilox roll when in use. The volume of the channel parts on the outer surface of the anilox roll is relatively large compared to state of the art volumes that are obtained using grid patterns of closed cells having a large line screen. With the anilox roll according to the present invention it is therefore possible to approach and/or improve the properties of the large line screen anilox rolls.

However, the pattern of the anilox roll according to the present invention also has a limitation of the direct spreading. With this, it is possible to also apply the details on the substrate during the printing. According to the state of the art, this was only possible using anilox rolls having a relatively small line screen. The anilox roll according to the present invention combines these two properties (heavy layer and small detail printing) and thus leads to a reduction in the amount of printing steps needed in the printing process.

The limitation in the spreading is obtained due to the fact that wall parts 25 always create somewhat limited channel parts that are on the other hand connected with each other via (indirect) connections. The channel parts according to the invention are limited due to the fact that distribution in a straight line in between the wall parts 25 is smaller than the indirect or curved distribution.

In the example of FIG. 3b the wave length is comparable to the grid size of the pattern. The grid size and the channel width are comparable. Preferably the wave length is smaller than four times the grid size, preferably smaller than two times the grid size. Due to the fact that the grid size and the wave length are comparable, in fact each time a cell like pattern is obtained that is comparable to a honeycomb pattern according to the state of the art. According to the invention, however, these cells are connected in a limited way with each other and separate connections are formed by removing closing wall parts.

The fluid can be distributed over a large part of the surface of the anilox roll if the followed path meanders over the surface.

The wave length may be 80 μm for example, whilst the grid size is equal to approximately 30 μm. The anilox roll according to the present invention, having these dimensions, combines the properties of anilox rolls having a large and small line screen, i.e. heavy layers of ink (first operational mode) and detail printing (second operational mode) possibilities.

Figure 3C:
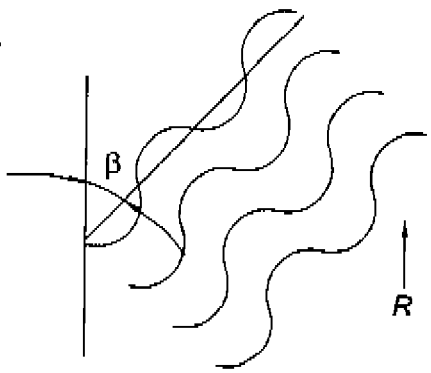

FIG. 3b shows an embodiment, wherein two walls that are situated next to each other are positioned at a distance from each other. Walls 26, 27 that are positioned next to each other have a distance d that is equal to two times the amplitude a of the sinusoid. Dips 26 of one wall go inside with tops 27 of the neighbouring wall. This embodiment ensures that the ink parts obtain a maximum free path. The structure/the pattern prevents that the mass to be taken up between the wall parts can easily spread, and more specifically that during the supply of ink by the anilox roll a large mass of ink can gather for supply. Curved connections between channel parts are possible. With this, the aforementioned gathering becomes possible, but only in a certain small amount. With this, relatively large volumes of mass may be transferred. Additionally it is possible, such as shown in FIG. 3c, to position the channels and the walls with angle β with respect to the direction of rotation (or circumferential direction) R. Especially for printing heavy layers of ink this is a beneficial embodiment.

Figure 3D:
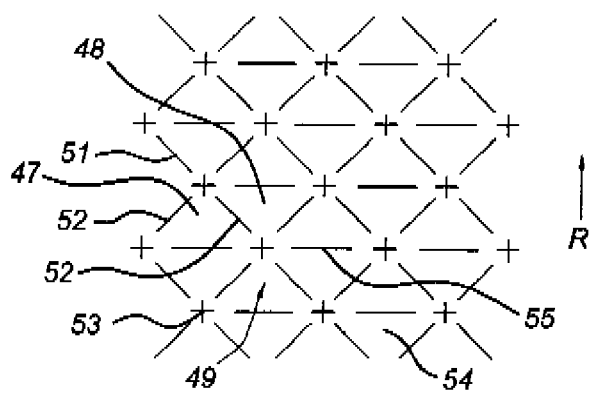

FIG. 3d shows another embodiment, wherein different restrictions 51, 52, 53, 55 are placed in such a fashion, that a regular pattern is formed. The line shaped restrictions 51, 52, 55 are positioned in a triangular fashion, wherein the corner parts of the triangle are formed by cross shaped restrictions 53. In between the cross shaped restrictions 53 and the ends of the line shaped restrictions 51, 52, 55 recesses are present. An ink particle can freely flow between different triangular channel parts 54. The free flow in a linear of straight line is limited. The walls form dams to restrict the spreading of mass in the channel parts. In addition, the walls form dams against the accumulation or concentration of ink, for example when the ink has being supplied.

The restriction in the shape of the cross shaped wall part 53 preferably has a size that blocks the flow of fluid along wall part 51, but allows diversion thereof. By increasing wall part 53 a larger barrier is formed. The distance between an end of wall part 51 or 52 and the cross shaped wall part does not change by this, however. The size of the connection part therefore stays the same.

The size of the connection part 49 is preferably equal to at least 10% of the length of wall part 52. By this the cell shaped channel parts 47, 48 that are positioned in opposite sides of wall part 52 have an open connection with each other. In addition two connections are formed between those cell shaped parts. In the first operational modus it is relatively easy to obtain a relatively large drop size of ink due to the fact that both cell shaped channel parts 47, 48 supply the ink.

The capacity of cell shaped channel parts 47, 48 is approximately equal to the relatively small drop size that is desired for printing details and corresponds to the drop size that is desired for printing details in the state of the art, such as for example 180 lines per centimeter anilox rolls.

This pattern ensures that the ink may be absorbed well in the anilox roll, and that the ink may be supplied well to the printing roll. Additionally this embodiment ensures that the ink has sufficient freedom to flow, and nevertheless that a film layer is present on the anilox roll.

Likewise, FIG. 3b is an example of a meandering channel since flow of fluid along a large part of the surface of the anilox roll is possible, because the cell shaped channel parts are connected with each other. By flowing along wall parts 51, 52 fluid is able to reach other cell shaped channel parts. Exactly this property ensures that the anilox roll is able to combine the printing properties of both the first and second modes of operation.

The embodiments of FIGS. 3a to 3d have a fluid distribution structure that is formed on the surface of the anilox roll, wherein the formed channels mainly have a similar depth. With this the volume size of fluid in the channels will not be disturbed locally and thus the fluid will remain more easily distributed over the outer surface than in the state of the art.

Figure 3E:
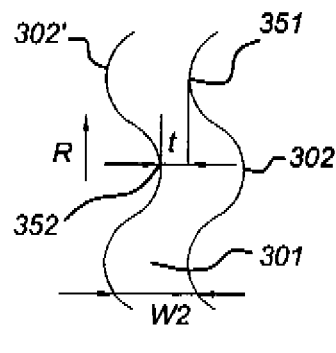

FIG. 3e shows a further embodiment according to an aspect of the invention. The embodiment shown comprises a channel 301, which has wall parts 302, 302'. The channel 301 has a width w2. The wall parts are positioned next to each other in a relative parallel oscillating fashion. In this way a sinusoid like oscillating channel is obtained. The wall parts are placed at such a distance from each other, that the top 351 and dip 352 that are closest to the centre of the channel 301, are spaced with an interval t. The interval suggests that straight lined distribution of the fluid is possible. It has turned out however that when the interval t is relatively small, this straight lined distribution is prevented. The wall parts form restrictions that determine a coarse of the formed channel. The formed channel meanders over the surface of the anilox roll.

The profile of the flow in the channel will mainly be the same in the different channel parts, which means that the profile of the flow will be the same in those parts of the channel that run in different directions. However, the direction of the profile of flow, and hence the flow, will be different in neighboring channel parts. The flow has no possibilities to develop in a straight line, in the direction of rotation R. The walls guide the flow in such a fashion that the flow can only meander over the channel. Preferably the interval t is small compared to the width w2 of the channel.

Preferably the interval t is smaller than 10% of the width w2 of the channel, and even more preferably smaller than 5% of the width of the channel.

Figure 3F:
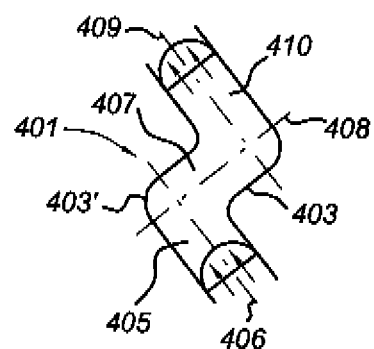

FIG. 3f shows an embodiment of a channel 401. The channel comprises sawtooth shaped walls 403, 403'. In the channel 401 different channel parts 405, 407, 409 are visible, each having their respective course 406, 408, 410. A course 408 of the channel part 407 is positioned at an angle with respect to the course 406 of a neighbouring channel part 405. In the embodiment shown the angle is approximately equal to 90 degrees, but it is also possible to use other angles. By positioning the channel parts at an angle with respect to each other, the straight lined distribution of fluid in the channel is prevented. On the other hand, meandering flow in the channel 401 is possible. The walls 403, 403' are placed in such a fashion that these walls guide the flow in a meandering fashion. Straight line distribution of the fluid is prevented by the walls.

Figure 3G:
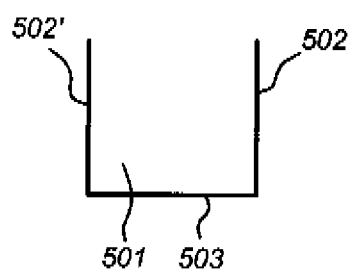

FIG. 3g shows a cross section of a channel 501 according to an embodiment of the invention. The bottom 503 of the channel is mainly flat. The walls 502, 502' are mainly positioned perpendicular to the bottom 503. In this way a relatively large amount of fluid can be absorbed in the channel. Preferably the width of the channel is large with respect to the height of the channel. In this way a large volume of fluid can be absorbed in the channel, and in this way it is also possible to supply the amount of fluid relatively easy. There is only a relatively small amount of fluid that will remain in the channel during the printing of the substrate.

Additionally, it is possible that the embodiment shown in FIG. 3g concerns a cell shaped channel and a channel according to an aspect of the invention. The bottom of the cell and the bottom of the channel are mainly positioned on the same level. This improves the flow of fluid between cells via the channels. In this way the channels prevent congestion or upward pressure in the fluid. Upward pressure in the fluid can be the result of the bottom of the (connecting) channel being positioned higher than the bottom of the cell.

Figure 3H:
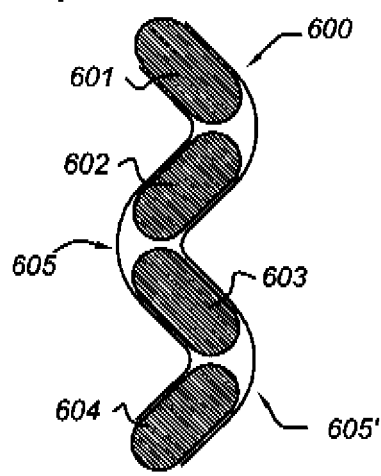

FIG. 3h shows a channel 600 having channel parts 601-605. The channel 600 is part of the fluid distribution structure for receiving, distributing over the anilox roll, as well as transferring the fluid onto a subsequent printing roll. The channel 600 is arranged for distribution and guiding the fluid over the fluid distribution structure. The meandering channel 600 which is shown here forms a heavy layer printing unit in the fluid distribution structure. The channel 600 comprises a detail printing unit that is formed in the meandering channel 600 by means of channel parts 601-605. The channel parts 601-605 each have a droplet volume that is suitable for detailed printing. Neighbouring channel parts are positioned at an angle with respect to each other for preventing straight lined distribution of the fluid in a course of the channel, as well as permitting meandering distribution of the fluid in the channel 600.

FIG. 4 shows in detail a restriction 33 according to an embodiment of the invention. In the embodiment shown in FIG. 3b the amplitude of the wave is larger than the width between two walls. The wall itself has a size of approximately 1-4 micrometers. The channel according to FIG. 3b has a width in between 10 and 150 micrometers, more preferably between 20 and 100 micrometers, and even more preferably between 30 and 80 micrometers. The wave can have an amplitude of at least approximately 50 micrometers. According to the invention an open structure is used for considerably reducing the size of the wall parts in comparison with the state of the art. This leads to a further increase of the surface that is available for receiving ink and for transferring ink by means of the outer surface of the anilox roll.

An open structure according to the invention can be characterised by larger surfaces of channel parts between wall parts that are formed on the outer surface of the anilox roll. The channel parts are connected with other large surfaces by means of connections that are provided in between the wall parts. Although a straight connection is preferably prevented, a limited, meandering connection is possible.

The pattern according to the invention and more specifically the pattern according to FIG. 3b reduces the amount of foaming that occurs in the anilox roll. Related to this is the fact that the channel parts and more specifically the channels are able to take up a mass, and more specifically ink, more easily. The rotation of the anilox roll according to FIG. 3b is mainly parallel to the base of the sinusoid, and therefore the air in the open channel parts can be driven out of that channel part because of the relatively open structure according to the invention.

Of course the invention is not limited to sine-like wave form channels. The channel and/or the walls may also have a sawtooth shape or any other repetitive pattern.

In an embodiment of the invention, the oscillating wall parts may show a phase difference with respect to each other. In this way each time a staggered pattern of wall parts is obtained. With this it is also possible to obtain the advantage according to the present invention.

FIG. 5 shows a schematic view of an apparatus for forming the structure in an anilox roll according to an embodiment of the invention. Here a laser is used 60. The laser is part of an engraving unit 61. The engraving unit is positioned along the longitudinal axis 62 of the anilox roll 63. The anilox roll 63 is only shown schematically. The figure is not drawn to scale. The engraving unit is positioned on a frame (not shown), and the frame enables movement of the engraving unit along the anilox roll 63 according to arrow 62. Suitable guiding means such as a guiding track may be applied.

The anilox roll 63 is positioned in a container that is supported on bearings and connected to the frame. In this way the anilox roll is able to rotate around the longitudinal axis 62 according to arrow 64. The combination of both rotation around the axis 62, as well as movement along the axis 62 enables tooling by engraving of the complete outer surface with the laser. The constructions for manufacturing, more specifically engraving the anilox roll according to the state of the art using these movements, enable tooling with accuracies of less than 1 micrometer. This amongst others enables that wall parts according to the embodiments of the invention are formed having a size of less than 5 micrometers. The method allows forming channels on the surface of the anilox roll. Material in the channels is evaporated, whilst the wall parts remain.

The laser beam can be concentrated in a spot 69 on the outer surface 70 of the anilox roll 63 by means of known optical guides 65-68, which in this embodiment are formed by four corner mirrors. At the position where the spot is formed a certain amount of heat is concentrated such that a piece of material of the outer surface of the anilox roll will evaporate. This material may be a ceramic composition, such as a chromium oxide. A person skilled in the art will be familiar with the different compositions and/or compounds.

By focusing the spot it is possible to evaporate a part of the outer surface of the anilox roll. In a preferred embodiment of the invention a continuous laser 60 is used. Synchronizing the pulses of the laser with rotational and longitudinal movements is more continuous. More specifically, it is possible to form a continuous track of evaporated material on the aniloxrol 63 by using a continuous laser together with continuous movements of the roll and/or engraving unit, thereby forming a channel. It is possible to form a continuous track at a high speed. The speed is limited by the power of the laser only.

In a further embodiment of the invention, the beam 71 of the laser 60 is influenced by an optical guide in the trajectory between the laser 60 and the spot 69. The optical guide 72 may enforce a reciprocal movement 73 of the spot over the surface to be engraved. As a result, the spot will repeatedly execute an identical movement, preferably with a continuous speed. This movement, together with the rotation of the anilox roll, may lead to a continuously changing location of the spot. Preferably, the reciprocal movement results in a shift 73 of the spot in a direction that is parallel to the longitudinal axis of the anilox roll. Such a change in combination with a continuous laser may for example be used for forming a pattern of channels according to FIG. 3b.

Preferably, the reciprocal movement is a sine or wavelike movement. The movement may be governed mechanically or electronically. In a preferred embodiment shown in FIG. 5, a combination of a crystal 74 on the one hand, and a voltage supplied by a power supply 75 on the other hand, is used. The voltage is supplied to the crystal. The optical guide 72 en more specifically the crystal 74 will function as a generation device for the reciprocal movement of the laser spot. A voltage is supplied to the crystal 74 for causing a change in the trajectory of the beam, more specifically in an eventual shift of the spot. The voltage supplied is, for instance, repetitive, resulting in the movement of the spot also being repetitive. A control unit 76 is, for example, provided in the electrical connection between the crystal 72 and the supply 75. The control unit is capable of adjusting the voltage supplied. The control unit may be connected to an external controller for synchronizing the crystal voltage with the rotation 64 of the anilox roll 63 and movement 62 along the anilox roll 63 of the engraving unit as a whole.

The change in voltage may be synchronized with the rotation of the anilox roll. The change in voltage is for example characterized by parameters such as amplitude and frequency. These two parameters may be related to the amount of shift and the repetition of the reciprocal movement, respectively.

In the embodiment shown, a tellurium dioxide crystal 74 may be used, for example. The crystal functions as a deflector. By changing the voltage between 0 V and 10 V, transmission properties of the crystal change. The crystal mentioned functions amongst others at 1064 nm.

Other embodiments of generator devices and optical guides are also possible. It is also possible to make use of a moving mirror. In another embodiment, an interference effect may be used for generating the reciprocal movement of the spot.

Another technique that is known to make use of such a wobbling of a channel formed on an outer surface, is a technique for forming DVD's. The inventor is aware that a technique known in this technical field may be used for forming such a pattern on an outer surface.

Variations on the embodiments of the different profiles are imaginable, without diverting from the main notion of the invention. It may be clear that the invention is described by using preferred embodiments. The invention is not intended to be limited to these embodiments.

According to a further aspect the following clauses are provided. Clause 1, a method for forming an anilox roll, comprising supplying a cylinder of the anilox roll that has an outer surface to be tooled, supplying at least a laser source and laser engraving the outer surface of the anilox roll with a laser spot that is formed by a laser source for obtaining a tooled anilox roll, wherein the method further comprises applying an optical guide in the light path of the laser for enabling the laser spot to move reciprocally on the outer surface to be tooled.

Clause 2: a method according to clause 1, wherein the laser spot generally moves with a constant speed over the outer surface of the anilox roll. Clause 3, a method according to clause 1 or 2, wherein the reciprocal movement causes a shift of the laser spot on the anilox roll in a direction that is mainly parallel to a longitudinal axis of the anilox roll. Clause 4: Method according to any one of the clauses 1, 2 or 3, wherein the shift is at least larger than the width of the laser spot in the likewise direction. Clause 5: Method according to any one of the preceding clauses, wherein the step of laser engraving further comprises rotating the anilox roll around a longitudinal axis of the anilox roll, as well as moving the laser in a direction mainly parallel to the longitudinal axis of the anilox roll.

Clause 6: Method according to any one of the preceding clauses, wherein the laser source is a continuous laser source, wherein a channel is formed on the outer surface of the anilox roll due to the laser engraving, wherein the channel extends in a rotational direction of the anilox roll.

Clause 7: Apparatus for forming an anilox roll to be used in a printing process, comprising a supporting unit for supporting the cylinder shaped anilox roll and for rotating the anilox roll around a longitudinal axis; an engraving unit that is arranged for parallel movement with respect to a cylinder-axis of the anilox roll for engraving a structure on the outer surface of the anilox roll, and a driving unit for driving the engraving settings of the engraving unit, wherein the engraving unit comprises at least a laser source for laser engraving the outer surface of the anilox roll with a laser spot, wherein the engraving unit further comprises an optical guide for moving the laser spot in a repetitive way. Clause 8: Apparatus according to clause 7, wherein the optical guide is arranged for moving the laser spot over the outer surface of the anilox roll with a generally constant speed. Clause 9: Apparatus according to clause 7 or 8, wherein the optical guide is a deflector. Clause 10: Apparatus according to any one of the clauses 7, 8 or 9, wherein the optical guide comprises a crystal, that is connectable to a power supply, wherein the crystal is arranged for deflecting the entering laser beam in dependence of an applied voltage. Clause 11: Apparatus according to any one of the clauses 7-10, wherein the optical guide is movably connected to the engraving unit. Clause 12: Apparatus according to clause 11, wherein the optical guide is connected to the engraving unit by means of a movement unit, and wherein the movement unit is arranged for enabling the laser spot to move reciprocally. Clause 13: Apparatus according to any one of the clauses 7-12, wherein the repetitive shift comprises a movement of the laser spot in a direction mainly parallel to the cylinder axis. Clause 14: Apparatus according to any one of the clauses 7-13, wherein the shift is at least larger then a width of the laser spot in the likewise direction. Clause 15: Apparatus according to any one of the clauses 7-14, wherein the reciprocal movement of the laser spot is at least 20 µm. Clause 16: Apparatus according to any one of the clauses 7-15, wherein the laser source is a continuous laser source, wherein the driving unit is connected to the supporting unit and to the movement unit, and wherein the driving unit is arranged for rotating the anilox roll during the laser engraving with a reciprocal moving spot. Clause 17: Apparatus according to any one of the clauses 7-16, wherein the engraving unit comprises an objective lens.

The invention claimed is:

1. Anilox roll for a printing apparatus for transferring a fluid, such as an ink, comprising a cylinder having a surface, wherein the surface comprises a fluid distribution structure for receiving the fluid, distributing the fluid over the cylinder, and transferring the fluid, wherein the fluid distribution structure is arranged to transfer in a first operational mode for printing heavy layers of ink a relatively large fluid droplet and in a second operational mode for printing details a relatively small fluid droplet by a combination of restrictions in the fluid distribution structure, wherein the fluid distribution structure has a channel formed in the surface for distributing the fluid over the fluid distribution structure, the channel having opposite channel walls positioned next to each other in a relative parallel oscillating fashion such that said channel is meandering over the surface, and both the channel and the channel walls have the form of a wave with a repetitive pattern, and the channel has a constant channel width between 10 and 150 µm in a direction parallel to an axis of rotation of said anilox roll, and said anilox roll has a total surface and the channel wall has a channel wall surface taking up less than 10% of said total surface.

2. Anilox roll according to claim 1, wherein the meandering channel has a wavelength that is smaller than 4 times the channel width.

3. Anilox roll according to claim 2, wherein the meandering channel has a wavelength that is smaller than 2 times the channel width.

4. Anilox roll according to claim 1, wherein the meandering channel has an amplitude that is either generally equal to or larger than the channel width.

5. Anilox roll according to claim 1, wherein the channel has a free path smaller than 150 µm, the free pathway being defined as a distance that an ink part may move in a random radial direction starting from a random point in said channel until said channel wall is reached.

6. Anilox roll according to claim 1, wherein the channel has a generally flat bottom having a generally equal channel depth, wherein the bottom has a substantially constant height level difference with respect to the surface of the anilox roll.

7. Anilox roll according to claim 1, wherein a further channel is provided adjacent the channel, said further channel having a course generally parallel to the channel.

8. Anilox roll according to claim 7, wherein the channel wall between the channel and the further channel has a channel wall width which channel wall width is smaller than 4 μm.

9. Anilox roll according to claim 8, wherein the channel wall width is in the range of 1-3 μm.

10. Printing apparatus comprising a printing device having a supply for a substrate to be printed and a supply for ink, wherein the printing device comprises an anilox roll according to claim 1 mounted in a bearing.

11. Printing apparatus according to claim 10, wherein the printing apparatus is a flexographic apparatus.

12. Anilox roll according to claim 1, wherein the channel width is between 20 and 100 μm.

13. Anilox roll according to claim 12, wherein the channel width is between 30 and 80 μm.

14. Anilox roll according to claim 1, wherein the channel has either a sine-like wave form or a sawtooth shape form.

15. Anilox roll according to claim 1, wherein channel wall surface takes up less than 5% of said total surface.

16. Anilox roll according to claim 15, wherein channel wall surface takes up less than 2% of said total surface.

17. Anilox roll according to claim 1, wherein said channel walls have an amplitude a such that said channel width w2 is equal to a sum of two times said amplitude a and an interval t, said interval t being less than 10% of said channel width w2.

18. Anilox roll according to claim 17, wherein said interval is less than 5% of said channel width.

* * * * *